(12) United States Patent
Burgess et al.

(10) Patent No.: US 9,678,716 B2
(45) Date of Patent: Jun. 13, 2017

(54) APPARATUS AND METHOD FOR PERFORMING ABSOLUTE DIFFERENCE OPERATION

(71) Applicant: ARM Limited, Cambridge (GB)

(72) Inventors: Neil Burgess, Austin, TX (US); David Raymond Lutz, Austin, TX (US)

(73) Assignee: ARM Limited, Cambridge (GB)

( * ) Notice: Subject to any disclaimer, the term of this patent is extended or adjusted under 35 U.S.C. 154(b) by 218 days.

(21) Appl. No.: 14/579,435

(22) Filed: Dec. 22, 2014

(65) Prior Publication Data

US 2016/0179469 A1 Jun. 23, 2016

(51) Int. Cl.
*G06F 7/544* (2006.01)
*G06F 7/509* (2006.01)

(52) U.S. Cl.
CPC .............. *G06F 7/509* (2013.01); *G06F 7/544* (2013.01); *G06F 2207/5442* (2013.01)

(58) Field of Classification Search
None
See application file for complete search history.

(56) References Cited

U.S. PATENT DOCUMENTS 5,235,536 A * 8/1993 Matsubishi ............. G06F 7/544
708/524
8,131,788 B1 * 3/2012 Chirila-Rus ............ G06F 7/544
708/201
2005/0210095 A1 * 9/2005 Lutz ..................... G06F 7/02
708/700
2006/0023959 A1 * 2/2006 Yang ..................... G06F 7/544
382/238

(Continued)

FOREIGN PATENT DOCUMENTS

GB 2 342 193 4/2000

OTHER PUBLICATIONS

Burgess, N., The Flagged Prefix Adder and its Applications in Integer Arithmetic, Journal of VLSI Signal Processing, vol. 31.3, pp. 263-271, (2002), 9 pages.

(Continued)

*Primary Examiner* — David H Malzahn
(74) *Attorney, Agent, or Firm* — Nixon & Vanderhye P.C.

(57) ABSTRACT

An apparatus comprises processing circuitry for performing an absolute difference operation for generating an absolute difference value in response to the first operand the second operand. The processing circuitry supports variable data element sizes for data elements of the first and second operands and the absolute difference value. Each data element of the absolute difference value represents an absolute difference between corresponding data elements of the first and second operands. The processing circuitry has an adding stage for performing at least one addition to generate at least one intermediate value and an inverting stage for inverting selected bits of each intermediate value. Control circuitry generates control information based on the current data element size and status information generated in the adding stage, to identify the selected bits to be inverted in the inverting stage to convert each intermediate value into a corresponding portion of the absolute difference value.

19 Claims, 5 Drawing Sheets

(56) References Cited

U.S. PATENT DOCUMENTS

2016/0179469 A1* 6/2016 Burgess .................. G06F 7/544
                                                              708/201

OTHER PUBLICATIONS

Kobayashi, N. et al., "A Low Power 90-nm CMOS Motion Estimation Processor Implementing Dynamic Voltage and Frequency Scaling (DVFS) and Fast Motion Estimation Algorithm", ISCAS 2008, pp. 1672-1675, IEEE Symposium on Circuits and Systems, (2008), 4 pages.

Vassiliadis, S. et al., "The Sum-Absolute-Difference Motion Estimation Accelerator", Euromicro Conference, 1998, vol. 2, pp. 559-566, Proceedings $24^{th}$, (1998), 8 pages.

* cited by examiner

APPARATUS AND METHOD FOR PERFORMING ABSOLUTE DIFFERENCE OPERATION

BACKGROUND

The present technique relates to the field of data processing.

Processing circuitry may be provided to perform various data processing operations on operand values. One such operation is an absolute difference operation to generate an absolute difference value representing the absolute difference between the first and second operands. This type of operation can be challenging to implement efficiently in a processing circuit, especially when supporting operations with different sizes of data values.

SUMMARY

Viewed from one aspect, the present technique provides an apparatus comprising:

processing circuitry to perform an absolute difference operation to generate an absolute difference value in response to a first operand and a second operand, wherein the first operand, the second operand and the absolute difference value each comprise at least one data element having a current data element size selected from a plurality of data element sizes, and each data element of the absolute difference value represents an absolute difference between corresponding data elements of the first and second operands;

the processing circuitry comprising:

an adding stage to perform at least one addition using corresponding portions of the first operand and the second operand to generate at least one intermediate value;

an inverting stage to selectively invert selected bits of the at least one intermediate value to convert the at least one intermediate value into at least one corresponding portion of the absolute difference value; and control circuitry responsive to the current data element size and status information generated by the adding stage in dependence on said at least one addition, to generate control information identifying said selected bits of the at least one intermediate value.

Viewed from another aspect, the present technique provides an apparatus comprising:

processing means for performing an absolute difference operation to generate an absolute difference value in response to a first operand and a second operand, wherein the first operand, the second operand and the absolute difference value each comprise at least one data element having a current data element size selected from a plurality of data element sizes, and each data element of the absolute difference value represents an absolute difference between corresponding data elements of the first and second operands;

the processing means comprising:

adding means for performing at least one addition using corresponding portions of the first operand and the second operand to generate at least one intermediate value;

inverting means for selectively inverting selected bits of the at least one intermediate value to convert the at least one intermediate value into at least one corresponding portion of the absolute difference value; and control means for generating, in response to the current data element size and status information generated by the adding means in dependence on said at least one addition, control information identifying said selected bits of the at least one intermediate value.

Viewed from a further aspect, the present technique provides a method of performing an absolute difference operation to generate an absolute difference value in response to a first operand and a second operand, wherein the first operand, the second operand and the absolute difference value each comprise at least one data element having a current data element size selected from a plurality of data element sizes, and each data element of the absolute difference value represents an absolute difference between corresponding data elements of the first and second operands;

the method comprising:

performing at least one addition using corresponding portions of the first operand and the second operand to generate at least one intermediate value;

in response to the current data element size and status information generated in dependence on said at least one addition, generating control information identifying selected bits of the at least one intermediate value; and inverting the selected bits of the at least one intermediate value indicated by the control information to convert the at least one intermediate value into at least one corresponding portion of the absolute difference value.

Further aspects, features and advantages of the present technique will be apparent from the following description of examples, which is to be read in conjunction with the accompanying drawings.

DESCRIPTION OF EXAMPLE EMBODIMENTS

Figure 1:
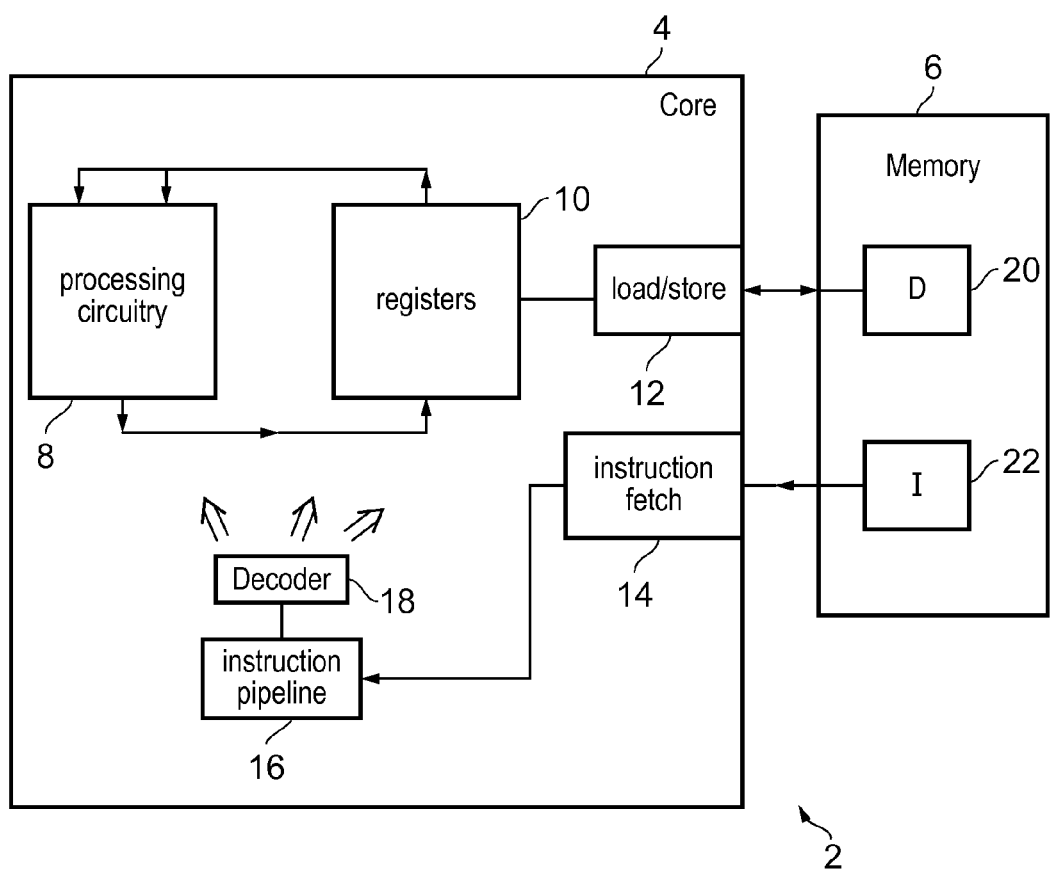
FIG. 1 schematically illustrates an example of a data processing apparatus.

An apparatus may comprise processing circuitry for performing an absolute difference operation to generate an absolute difference value in response to a first operand and a second operand, where the first operand, the second operand and the absolute difference value each comprise at least one data element and each data element of the absolute difference value represents an absolute difference between corresponding data elements of the first and second operands. Each data element may have a current data element size selected from a plurality of data element sizes supported by the processing circuitry. The processing circuitry may have an adding stage to perform at least one addition using corresponding portions of the first operand and the second operand to generate at least one intermediate value, an inverting stage to selectively invert selected bits of the at least one intermediate value to convert the at least one intermediate value into at least one corresponding portion of the absolute difference value, and control circuitry responsive to the current data element size and status information generated by the adding stage in dependence on said at least one addition, to generate control information identifying said selected bits of the at least one intermediate value.

One might expect that an absolute difference operation would require two additions and an inversion: one addition to determine a difference value and an inversion and second addition to negate the difference value to determine the absolute difference value if the difference value is negative. However, this may require twice as much adding circuitry or may slow down processing of the absolute difference operation.

In contrast, by controlling the inverting stage to invert selected bits of the intermediate value, which are selected by control circuitry in dependence on status information from the adding stage, the intermediate value generated by the adding stage can be converted into the corresponding portion of the absolute difference value by the inverting stage, so that no second addition is necessary. This may allow the absolute difference operation to be performed with less adding circuitry, improved performance and reduced power consumption.

Also, the control circuitry may select the selected bits to be inverted by the inverting stage based on the current data element sizes so that absolute difference calculations across a range of data element sizes can be implemented efficiently using a common processing circuit. Even if each addition performed in the adding stage is performed using a different number of bits to the current data element size, the inversions in the inverting stage may be controlled so that the result of the inverting stage gives the same result as if a larger addition had been performed, so that even relatively large data element sizes may be implemented more quickly using a series of smaller additions.

The inverting stage may support inverting none, some or all of the bits of each intermediate value depending on the status information and the current data element size.

The adding stage may include a number of N-bit adding units each for performing an N-bit addition using corresponding N-bit portions of the first and second operands to generate an N-bit intermediate value. Similarly, the inverting stage may include N-bit inverting units which each invert selected bits of the N-bit intermediate value generated by a corresponding adding unit to generate a corresponding N-bit portion of the absolute difference value. The control circuitry may generate control information separately for each inverting unit to indicate the selected bits for that inverted unit. This is useful for supporting different data element sizes. In some examples the supported data element sizes may each be a multiple of N bits.

Each adding unit may add an N-bit portion of the first operand to an inverted value obtained by inverting a corresponding N bit portion of the second operand. A carry value selected based on the current data element size may also be added (alternatively, this carry value could be implemented by controlling the inversions at the inverting stage, but this approach may be more complex and as there may anyway be an unused carry input in each N-bit adding unit, it may be simpler to add the carry at the adding stage). The carry value may be 1 for an N-bit adding unit operating on portions of the first and second operands which include the least significant bit of a data element, and 0 for other N-bit adding units. By inverting the second operand and adding 1 at the least significant portion of each data element, this effectively negates the second operand so that each N-bit adding unit of the adding stage is implementing a subtraction of an N-bit portion of the second operand from an N-bit portion of the first operand.

If the data element size has a number of bits M which is larger than the number of bits N added by each adding unit, then the actual value of the absolute difference value for a pair of M-bit data elements would be equal to the M-bit element of the first operand minus the corresponding M-bit element of the second operand to generate a difference value, and if the difference value is negative, negating the result by inverting all M bits of the difference value and adding 1. However, actually carrying out such an M-bit addition and negation may be slow.

As mentioned above, the operation can be performed faster using N-bit adding units and inverting units, where N<M. However, in this case the N-bit intermediate value generated by each adding unit of the adding stage may not be the same as a corresponding N-bit portion of an M-bit value which would be obtained if a full M-bit addition was performed over all M bits of the corresponding data elements of the first and second operand values. Therefore, the control circuitry may select the selected bits of the intermediate value to be inverted by each inverting unit, so that the N-bit intermediate value from the corresponding adding unit is converted into the value which the corresponding N-bit portion of the M-bit absolute difference value should have if it was actually generated using an M-bit calculation. Several factors may be considered by the control circuitry in order to generate the control information for identifying the bits to be inverted, as explained in the following paragraphs.

Firstly, if an actual M-bit addition was performed, there could be a carry between respective N-bit portions of the addition, but this would not be considered in the adding stage performing individual N-bit additions. Therefore, the control circuitry may select the bits of the intermediate value to be inverted based on status information indicating whether there would be such a carry from a lower N-bit portion to an upper N-bit portion of a data element if an M-bit addition was performed. Also, if status information indicates that the result of subtracting a data element of the second operand from a corresponding data element of the first operand would be negative, then a negation may be required, which may require inverting all the bits of the intermediate values corresponding to that element, and adding 1 at the least significant bit of the data element, which could cause a carry propagating through the result which could reach upper N-bit portions of the data element. Therefore, the control circuitry may consider status information indicating whether the overall difference between two M-bit data elements would be negative, and whether negation would cause a carry to an upper N-bit portion of the data element, in order to select the selected bits to be inverted in order to convert each N-bit intermediate value into the corresponding portion of the actual absolute difference value.

Note that the control circuitry may determine whether carrying out the M-bit addition would cause carries and generate a negative result, whether negation is required and whether negation would cause carries propagating into upper portions of data elements, without actually performing these operations. Instead, each adding unit may simply output at least one status indication based on the individual N-bit addition performed by that adding unit, and the control circuitry may combine these status indications to generate the control information identifying the bits to be inverted.

For example, the status indications may include different types of information. One example is a carry propagate value which is indicative of whether a carry into a given adding unit would trigger a carry output from that adding unit. Also, another example of a status indication may be a carry generate value indicative of whether the addition performed by that adding unit would generate a carry output. By combining the carry propagate value and carry generate value of the respective N-bit adding units, this can be enough to determine (i) whether the result of subtracting corresponding M-bit data elements would be negative, and (ii) whether either the initial addition by the adding stage or an addition for negation of the intermediate value would cause a carry into each N-bit intermediate value. The carry propagate value and carry generate value may often be derivable from XOR and AND gates used to generate the sum and carry bits of the addition, so very little additional circuitry may be required to generate this status information.

The control circuitry may determine, based on the current data element size and the at least one status indication from the N-bit adding units, at least one group status indication indicative of at least one property of a group of N-bit additions performed on respective N-bit portions of the first and second operands corresponding to the same data element. The control information identifying the selected bits can then be derived from the at least one group status indication. The group status indication may for example provide information about the status of a group of M bits corresponding to one data element, to reflect properties which would have been detected had the absolute difference calculation actually been performed over M bits. For example, the group status indication may include one or more of a sign value indicating whether, if the group of N-bit additions had been performed as a single M-bit addition, the result would have been positive or negative, at least one group generate value indicating whether, there would have been a carry from a lower N bits to an upper N bits if an M-bit addition had been performed, and at least one group propagate value indicating whether if an M-bit addition was performed, a carry in to the M-bit addition would cause a carry to propagate to one or more upper N-bit portions of the addition. In some cases the sign value may simply be the group generate value generated for the upper N bit-portion of the M-bit element, which indicates whether there would be a carry out of these N bits if an M-bit addition was performed. These status indications may provide information which allows the control circuitry to determine which bits need to be inverted in order to implement the required carries and negations to give the absolute difference value. The group status indications described above can all be derived from the individual carry generate and carry propagate values generated by the respective N-bit adding units.

Also, the at least one status indication from an adding unit may include a flag value which indicates which bits of the intermediate value generated in the addition of that adding unit would change state if 1 was added to the result of the addition. Hence, if the control circuitry determines that there is a situation in which a carry is required, the flag value can be used to determine which bits of the corresponding intermediate value should be inverted to give the same result as actually adding the carry value, allowing an addition step to be eliminated. By doing this for each N-bit portion, this provides a fast and area-efficient technique for implementing the absolute difference operation.

The control circuitry may include flag value adjustment circuitry for selectively adjusting the flag value of the corresponding adding unit based on the group status indication(s) (or more generally based on the current data element size and the at least one status indication generated by one or more of the adding units). In this way an adjusted flag value can be generated which identifies which bits of the corresponding intermediate value are to be inverted by the inverting unit. The inverting unit may combine the intermediate value with the adjusted flag value using an exclusive or (XOR) operation, which can be performed relatively quickly and with little circuit overhead. Depending on the other status indications generated by each adding unit (e.g. the carry propagate and generates values), the flag value may need to be adjusted to indicate different patterns of bits to be inverted. More particularly, the flag value adjustment circuitry may support generating as the adjusted flag value any one of: the original flag value unchanged; an inverted version of the flag value; a value for which all bits of the adjusted flag value are high (logical 1, indicating that all bits of the corresponding intermediate value should be inverted), and a value for which all bits are low (logical 0, indicating that none of the bits of the corresponding intermediate value should be inverted). By supporting these four types of adjustment, the intermediate value can be converted into the correct value of the corresponding portion of the absolute difference value for all possible outcomes, so that it is not necessary for any further additions in order to generate the absolute difference. These four manipulations of the flag value may be supported with little circuit overhead. For example, an OR gate and an XOR gate may be provided in the flag value adjustment circuitry for each N-bit processing lane.

In some cases the absolute difference value generated in the absolute difference operation may be the final result. For example, when executing an absolute difference instruction specifying the first and second operands, the absolute difference value may be output as the result to the instruction.

However, in other examples the absolute difference operation may be part of an absolute difference accumulate operation, in which each data element of the absolute difference value is then added to a corresponding data element of a third operand to generate a corresponding data element of a result value. The third operand could be an independently specified operand which is separate from the first and second operands and also separate from the register storing the result value. However, in many cases the third operand may be the previous value stored in a result register to which the result value is to be written. This is useful for implementing a sum of absolute differences calculation in which differences between the respective pairs of values are calculated and the total of the differences is accumulated into a result register. This operation can be very useful in image processing applications for example.

FIG. 1 schematically illustrates an example of a data processing apparatus 2 comprising a processor core 4 and a memory 6. The processor core includes processing circuitry 8, a register bank 10, a load store unit 12, and instruction fetch unit 14, an instruction pipeline 16 and an instruction decoder 18. It will be appreciated that the core 4 could include many other elements not illustrated in FIG. 1 for conciseness and that this is just an example of what may be provided. The memory 6 may include a cache or main memory or both and in some cases may include several caches in a hierarchical structure. The memory stores data 20 and instructions 22. In operation, instructions 22 in the memory 6 are fetched by the instruction fetch unit 14 and passed to the instruction pipeline 16. The instruction pipeline 16 may include a number of pipeline stages such as a decode stage, a register renaming stage, or an issue stage for example. At the appropriate stage of the pipeline the instruction decoder 18 decodes the fetched instructions to generate control signals for controlling various parts of the processor core 4 to execute the operations represented by the instructions. For example the decoder 18 may control the load store unit 12 to load data 20 from the memory 6 and place the loaded data in a register 10 or store data from the registers 10 to memory 6. Also the decoder may control the processing circuitry 8 to obtain one or more data values from the registers 10, perform a processing operation (such as an arithmetic operation, a logical operation or other kind of operation) using the data values and then write the result of the processing operation back to the register bank 10.

The processing circuitry 8 may support single instruction multiple data (SIMD) processing, also known as vector processing, in which operands comprising a number of data elements are processed to generate a result value also comprising a number of data elements, with each result data element corresponding to the result of a processing operation performed on corresponding sets of data elements from the input operands. SIMD processing can be useful to allow a number of similar calculations to be performed using different input values in parallel in order to improve performance.

Figure 2:
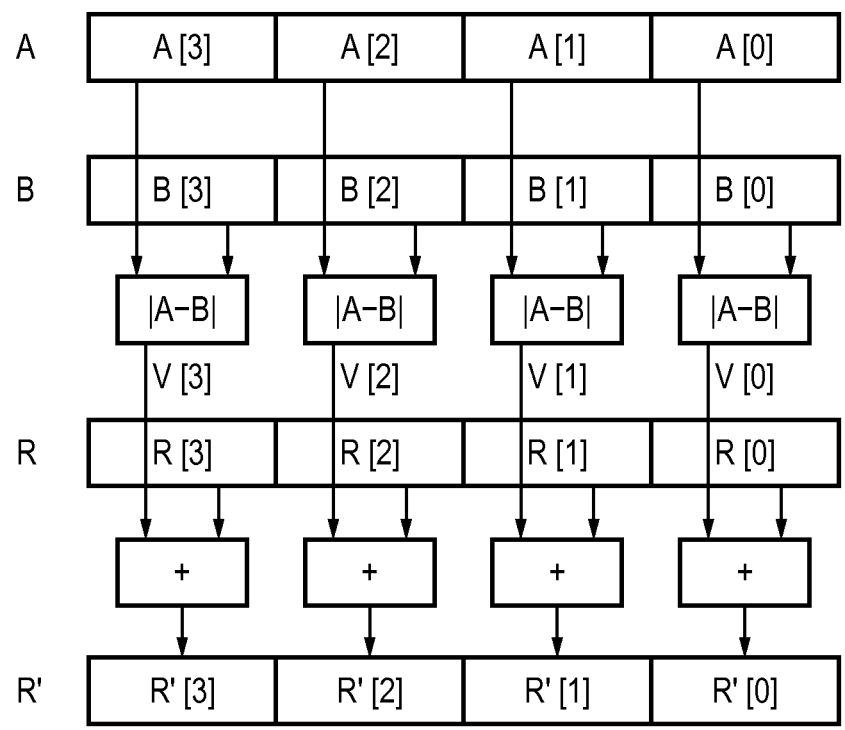
FIG. 2 shows an example of an absolute difference accumulate operation.

FIG. 2 shows an example of a SIMD operation, namely an absolute difference accumulate operation. Two input operands A, B are received each comprising four data elements A[3] to A[0] and B[3] to B[0]. For each lane of processing, the processing circuitry 8 generates an absolute difference data element V[3] to V[0] representing the absolute difference between corresponding elements of the operands A and B and then adds the absolute difference element V to a corresponding data element R[3] to R[0] of a third operand stored in a result register, to generate final result data elements R'[3] to R'[0] which are written back to the result register. Hence, each element R'[i] of the result register is generated according to R'[i]=|A[i]−B[i]|+R[i], where i=0 to 3. The absolute difference accumulate operation can be useful for image processing, for example, in particular for feature recognition, motion estimation or other types of operation which assess the similarity of two images. For example, the images may be divided into blocks and the absolute difference accumulate operation may be used for each pair of corresponding blocks in the two images to find the absolute difference between values indicative of a property of the corresponding blocks and to add the absolute difference value to an accumulation value obtained from carrying out the absolute difference accumulation over all previous blocks. The resulting accumulation value may then represent the degree of similarity of the two images.

Each operation applied to corresponding elements of the inputs to generate a corresponding element of the result value may be referred to herein as a "lane" of processing. In some systems each lane of processing may be performed sequentially one lane at a time, using a single processing circuit. However, faster processing can be achieved by performing at least some lanes of processing in parallel, or performing all lanes in parallel if there is sufficient hardware.

Figure 3:
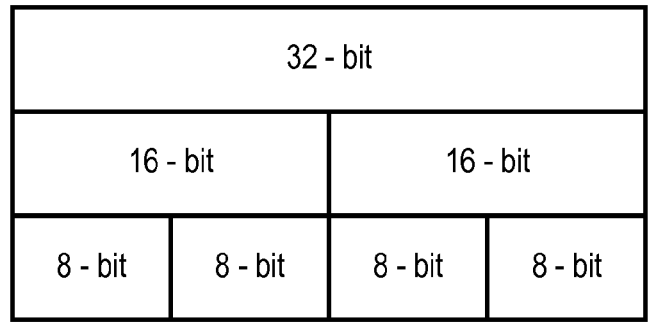
FIG. 3 shows an example of different data element sizes supported for operands processed by the processing circuitry.

While FIG. 2 shows an example in which each operand includes four data elements, the processing circuitry 8 may support processing of vector operands with different numbers of data elements, and/or vectors with data elements of different sizes. For example, as shown in FIG. 3, a 32-bit operand could be interpreted as containing one 32-bit data element, two 16-bit data elements or four 8-bit elements. It will be appreciated that these numbers of bits are just an example and that other systems may support larger operands or different sizes of data elements. It is also possible to support vector operands with a greater number of data elements than the number of processing lanes provided in hardware, by using multiple passes of the hardware to calculate respective subsets of the data elements of the vector.

While FIG. 2 shows an example of an absolute difference accumulate operation in which the absolute difference value V[i]=|A[i]−B[i]| is added to a third operand element R[i] to produce a modified accumulate operand R'[i], in other examples the absolute difference value V[i] may be the end result and there may be no subsequent addition. For example, the processing circuitry may support distinct absolute difference and absolute difference with accumulate instructions to signal whether the addition to the third operand should be performed. Alternatively, the two types of instruction could be implemented in the same way, but for the absolute difference (without accumulate) instruction the third operand R[i] could be set to 0.

Also, while FIG. 2 shows an example in which the third operand R[i] is the value which was stored in the destination register before executing the absolute difference accumulate operation, other systems may be able to perform the absolute difference operation with an arbitrary third operand stored in a source register other than the destination register for the instruction.

Such an absolute difference operation or absolute difference accumulate operation may be challenging to implement efficiently in a processing circuitry when different data element sizes need to be supported. One may expect that to determine an absolute difference value, it is necessary to subtract one of the input data elements A[i], B[i] from the other to produce an initial difference, and then to negate the difference if the initial difference turns out to be negative. Negation of a two's compliment value would normally be performed by inverting all the bits of the value and then adding one. Hence, the absolute difference operation would appear to require a first addition, an inversion, and then a second addition, which may be slow. One approach may be to perform two additions in parallel to determine both A[i]−B[i] and B[i]−A[i], and then select the output of one of these additions depending on which result is positive. However, this would still require twice the amount of adding circuitry to perform the two separate additions, which is costly in terms of circuit area and power consumption.

Figure 4:
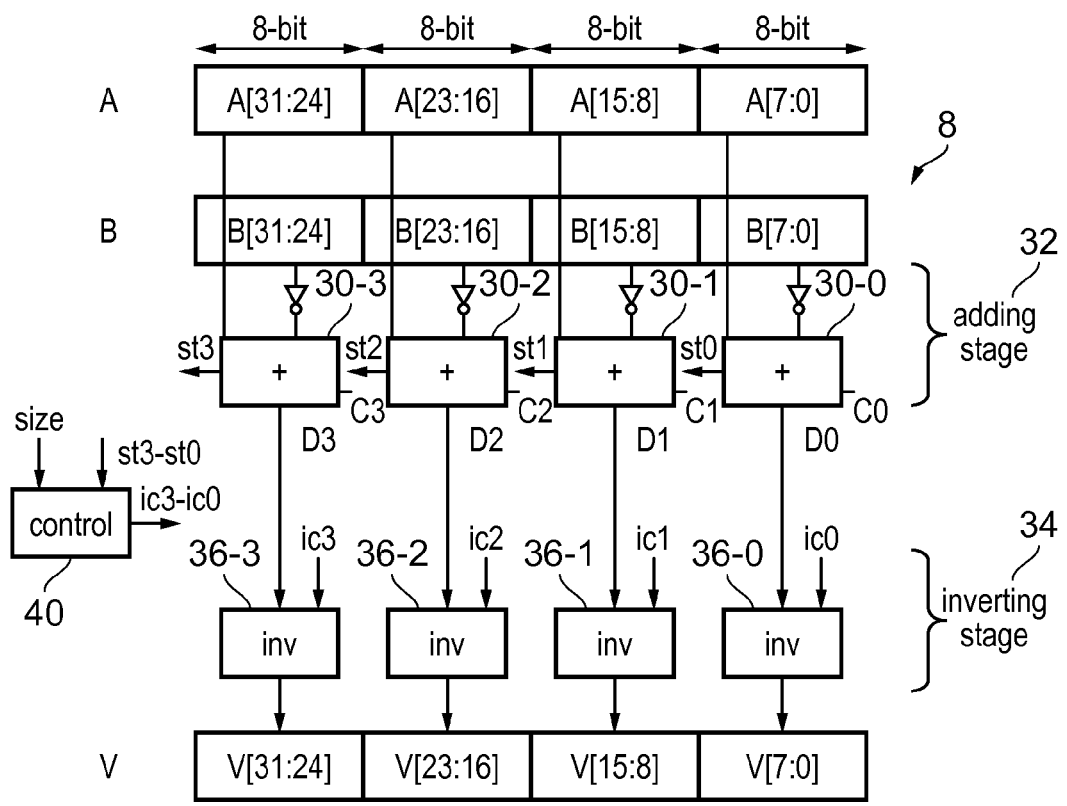
FIG. 4 shows an example of performing an absolute difference operation.

As shown in FIG. 4, it is possible to determine the absolute difference value V[i] for each data element using a single adding stage and a subsequent inverting stage while supporting a range of data element sizes. There is no need for the adding circuitry to be any wider than the width of the operands themselves. A subsequent adding stage may then be used to add the absolute difference value V to the third operand R if necessary, but this is not shown in FIG. 4 which only shows the absolute difference part of the operation shown in FIG. 2.

To support different data element sizes, the input operands A and B are divided into portions of a certain size, e.g. 8 bits in this example. In the notation used for FIGS. 4 and 5 below, the index i (i=0, 1, 2 or 3) is provided as a shorthand way of referring to each 8-bit portion of the calculation, i.e. i=0 corresponds to bits [7:0] of each vector operand, i=1 corresponds to bits [15:8], i=2 corresponds to bits [23:16] and i=3 corresponds to bits [31:24]. For example, A[3] and A[31:24] are equivalent ways of referring to the upper 8 bits of the A operand. The processing units and information provided for each 8-bit portion are labelled with the corresponding index. When a numeral or indication containing the general index i is used (e.g. 30-i, sti), then this may refer to the corresponding feature for any one of the 8-bit portions (e.g. any of adding units 30-0, 30-1, 30-2, 30-3 or status information st0, st1, st2, st3)

The respective 8-bit portions of the input operands A and B are provided to a row of 8-bit adding units 30-3 to 30-0 provided within an adding stage 32 of the processing circuitry 8. Each adding unit 30-$i$ adds an 8-bit portion of operand A to an inverted value obtained by inverting the corresponding 8-bit portion of operand B, and also adds a carry value ci which is selected for that adding unit in dependence on the current data element size for the operation. In general, the carry value ci is asserted for those adding units 30-$i$ operating on the lowest portion of a given data element and is cleared for any higher adding units operating on higher portions of a data element. Each adding unit 30-$i$ outputs a difference value Di which represents A[i]+~B[i]+ci for the corresponding 8-bit portion of the input operands (the "~" in ~B[i] indicates that the bits of B[i] are inverted). However, the difference values Di do not reflect any carries between the respective 8-bit portions of the operands, which would be required if the data element size is greater than 8 bits. Such carries can be accounted for in the inverting stage 34. In addition to the difference values Di, each adding unit 30-$i$ also generates some status information sti which represents at least one property of the addition performed by that adding unit. Control circuitry 40 is provided with this status information sti as well as a size parameter indicating the current data element size selected for the instruction being executed, and generates control signals ici for controlling selective inversions of some or all of the bits of the respective difference values Di. The inverting stage 34 includes a number of inverting units 36-$i$ which each invert the bits of the difference value Di which are indicated by the inversion control information ici for the inverting unit, to generate the corresponding 8-bit portion of the absolute difference value V.

The inversion control provided by the control circuitry 40 may take account of several aspects of the absolute difference calculation. Firstly, as mentioned above when the data element size is larger than 8-bit then an addition of the respective 16 or 32-bit elements of the input operands A, B may result in some carries from a lower 8-bit portion to a higher 8-bit portion. However, when such an addition is divided into 8-bit portions which are performed independently in the adding stage 32, then such carries are not considered in the adding stage 32. However, the inverting stage 34 can apply a set of inversions to a number of bits selected so as to give the same result as if a carry had been propagated between different adding units at the adding stage 32. Also, if the difference between two data elements is negative, then the difference value would need to be negated to produce the corresponding element of the absolute difference V, which would typically require inverting all the bits of a data element and adding 1. Hence, the inversion applied by a given inversion unit 36-$i$ may reflect whether there needs to be an inversion as part of this negation, and in addition, whether adding 1 at the least significant end of a data element could result in a carry being propagated up to the 8-bit portion being considered by that inversion unit 36-$i$. Hence, the control circuitry 40 may take account of all of these considerations in order to generate the control information ici for controlling each inverter to generate a corresponding portion of the absolute difference value V which would have the same value as a corresponding 8-bit portion of a value which would have been obtained if the absolute difference value had been performed using circuitry of the same width as the data element itself.

In this way, the absolute difference operation can be performed with just a single adding stage and a subsequent inverting stage without requiring two adders as in conventional techniques. This helps to reduce circuit area, improve performance and reduce power consumption.

Figure 5:
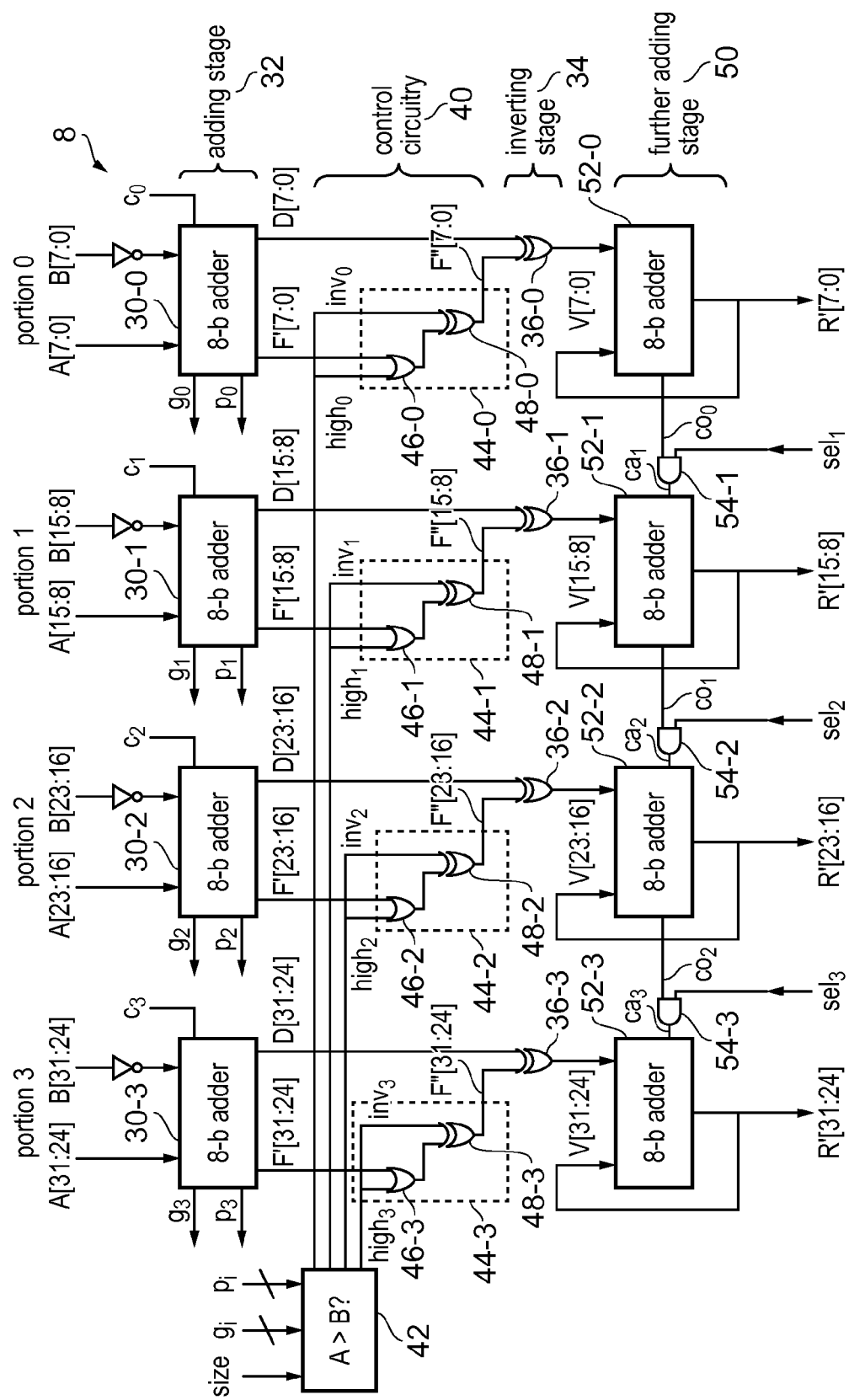
FIG. 5 shows in more detail processing circuitry for performing the absolute difference operation.

FIG. 5 shows in more detail an example of processing circuitry 8 for performing an absolute difference accumulate operation. In this example the Figure shows not just the circuitry for performing the absolute difference part of the absolute difference operation but also shows a further adding stage 50 for adding the absolute difference value V to a third operand R in order to accumulate the absolute difference into the result value R. The further adding stage 50 is optional and some circuits may omit this and generate the absolute difference value V as the end result.

The adding stage 32 includes a number of 8-bit adders 30-3 to 30-0 which add an 8-bit portion of operand A to an inverted version of an 8-bit portion of operand B and a carry value $c_i$ which is set according to table 1 shown below:

TABLE 1

| size | $c_3$ | $c_2$ | $c_1$ | $c_0$ |
| --- | --- | --- | --- | --- |
| 8-bit | 1 | 1 | 1 | 1 |
| 16-bit | 0 | 1 | 0 | 1 |
| 32-bit | 0 | 0 | 0 | 1 |

Essentially the carry value ci is set to 1 for the adding unit operating on the lowest 8 bits of each data element, and 0 for other adding units. As discussed above, the adder outputs a difference value D which is the result of the addition of A+~B+$c_i$ for the corresponding 8-bit portion.

In addition, each adding unit 30-$i$ outputs several pieces of status information sti which are illustrated in more detail in FIG. 5, including a carry generate bit $g_i$ and a carry propagate bit $p_i$. The carry generate bit $g_i$ indicates whether the corresponding 8-bit addition performed by the adding unit 30-$i$ generated a carry output (e.g. the generate bit $g_i$ may be equal to the carry value resulting from the upper bit of the addition). The carry propagate bit $p_i$ represents whether a carry in to the adding unit 30-$i$ would cause a carry to be output (e.g. the carry propagate bit $p_i$ may be 1 if, for each bit position within the 8 bits added by adding unit 30-$i$, an XOR of the corresponding bits of A and ~B equals 1). Since the ~B input has been inverted from the original value of the B input, then in practice $p_i$ will be 1 if the corresponding 8-bit portions of operands A and B are equal.

Each adding unit 30-$i$ also generates a flag value F'[i] indicating which bits of the corresponding difference value D[i] would change state if one was added to the difference value D[i]. The multiple-bit flag value F'[i] can be obtained such that the kth bit of F'(k)=1 if A(j) XOR B(j) is 1 for all bits from j=0 to j=k−1. For example an initial flag value F may be determined in which each bit is set to 1 if all pairs of corresponding bits of the two values being added are different from that bit position down:

Concept of flag bits (applied to vectors of 4 8-b elements):

| A[31:0] | 11010100 | 01010100 | 01111010 | 11010100 |
| --- | --- | --- | --- | --- |
| ~B[31:0] | 01111011 | 10101011 | 01100101 | 01100011 |
| F[31:0] | 00001111 | 11111111 | 00011111 | 00000111 |

F(n) is set high if all (A,B) pairs from bit n down are different i.e. for bit n of F,
F(n)=F(n−1)&(A[n]⊕B[n]). For example, the initial flag value F can be determined from the same XOR units used to determine the sum bits for the addition, and in a common process to the process for determining the carry propagate bit (the carry propagate bit $p_i$ will be 1 if all bits of the initial flag value F are 1).

The initial flag value can then be left shifted by one bit position to generate the flag value F'[i] to be output by the adding unit, which indicates which bits of A+~B+ci would switch states if 1 was added to the result of A+~B. For example:
Example of F[n] usage for 8-b additions:
Left shift F by one place, append '1', and XOR with A+B to get A+B+1

| A[31:0]  | 11010100  | 01010100  | 01111010  | 11010100  |
|----------|-----------|-----------|-----------|-----------|
| ~B[31:0] | 01111011  | 10101011  | 01100101  | 01100011  |
| A + ~B   | 101001111 | 011111111 | 010011111 | 100110111 |
| F' [31:0]| 000011111 | 111111111 | 000111111 | 000001111 |
| A + ~B + 1 | 101010000 | 100000000 | 010100000 | 100111000 |

Hence, the flag value F' allows the inversion stage 34 to provide inversions which replicate changes in the bit values which would occur if a carry was input, so that it is not necessary to actually perform an addition to implement such carries.

The control circuitry 40 includes control signal generating circuitry 42 which receives the carry generate and carry propagate bits of the respective adders 30 and a size indication indicating the currently selected data element size, and generates control signals $high_i$ and $inv_i$ for each 8-bit inverting unit (see Tables 2 to 4 below). The control signals $high_i$ and $inv_i$ are provided to flag adjustment circuitry 44-i for adjusting the flag value F'[i] for the corresponding inverting unit to generate an adjusted flag value F"[i] which indicates which bits of the difference value D[i] are to be inverted to produce the corresponding 8-bit portion of the absolute difference value V[i]. Each flag adjustment circuit 44-i includes an OR gate 46-i for ORing $high_i$ with F'[i] (forcing all bits of F'[i] to 1 if $high_i$ is 1), and an XOR gate 48-i for XORing the result of the OR gate 46-i with $inv_i$ to generate the adjusted flag value F"[i] (effectively inverting the bits of the flag value, which may either be in its original form or with all its bits forced high by OR gate 46-i). Each inverting unit 36-i comprises another XOR gate to XOR the adjusted flag value F"[i] with the difference value D[i] to generate the corresponding 8-bit portion of the absolute difference value V[i].

The control signal generating circuitry 42 generates the control signals $high_i$ and $inv_i$ according to Tables 2 to 4 below. As shown in Table 2, the control circuitry 42 may generate a group generate bit G and a group propagate bit P from the individual carry generate bits $g_i$, and carry propagate bits $p_i$, generated by each 8-bit adder 30. The group generate and propagate values G, P cover the whole element width. The most significant group generate bit $G_i$ for each data element is a sign bit indicating whether A–B for this element would be positive or negative if A–B was actually calculated over the whole data element size rather than in individual N-bit portions. The other group generate values $G_i$ for smaller 8-bit portions of the data element indicate whether that 8-bit result should receive a carry in due to the initial addition being split into 8-bit portions. The group propagate bits $P_i$ indicate whether each 8-bit result would receive a carry if the overall data element was negated. Table 2 shows how each group generate/propagate value G, P is generated.

TABLE 2

| | group generate/propagate values: | | | | | | |
|---|---|---|---|---|---|---|---|
| size | $G_3$ | $G_2$ | $G_1$ | $G_0$ | $P_2$ | $P_1$ | $P_0$ |
| 8-bit | $g_3$ | $g_2$ | $g_1$ | $g_0$ | — | — | — |
| 16-bit | $g_3\|p_3\&g_2$ | $g_2$ | $g_1\|p_1\&g_0$ | $g_0$ | $p_2$ | — | $p_0$ |
| 32-bit | $g_3\|p_3\&g_2\|p_3\&p_2\&g_1$ | $g_2\|p_2\&g_1\|p_2\&p_1\&g_0$ | $g_1\|p_1\&g_0$ | $g_0$ | $p_2\&p_1\&p_0$ | $p_1\&p_0$ | $p_0$ |

Tables 3 and 4 shows how to use the group generate/propagate values G, P to generate the control signals $inv_i$, $high_i$ for "top portions" and "bottom portions" respectively. The "top portions" refer to the control signals calculated for portions of data elements other than the lowest 8 bits of the data element, while the "bottom portions" refer to the lowest 8-bit portions of each data element (if the data element size is 8 bits then each portions with i=0, 1, 2 and 3 is considered a bottom portions). The tables 3 and 4 explain why different patterns of inversions are applied in different situations.

In Tables 3 and 4, the second column indicates whether the overall element is positive or negative. This may be determined from the sign bit represented by the most significant G bit for each element, i.e.:

for 8-bit elements, $G_0$ indicates the sign of bits [7:0], $G_1$ indicates the sign of bits [15:8], $G_2$ indicates the sign of bits [23:16], and $G_3$ indicates the sign of bits [31:24]

for 16-bit elements, $G_1$ indicates the sign of bits [15:0] and $G_3$ indicates the sign of bits [31:16]

for 32-bit elements, $G_3$ indicates the sign of bits [31:0]

The element is positive if the sign bit is 1 and negative if the sign bit is 0.

TABLE 3 transformation of F'[n] for top portion of each data element
(for 16-bit data elements: portions 1, 3; for 32-bit data elements: portions 1, 2, 3)
$G_{k-1}$, $P_{k-1}$ refer to the group generate and group propagate values calculated
for portion k – 1 to the right of the portion k for which the $inv_k$ and $high_k$ signals are
being calculated (e.g. when calculating the signals for portion 3, $G_2$ and $P_2$ are used)

| | element | $G_{k-1}$, $P_{k-1}$ | Action | $inv_k$ | $high_k$ | Why? |
|---|---|---|---|---|---|---|
| 1 | Negative | 0, 0 | Invert D[n] | 0 | 1 | Negative difference (so negate by inverting D[n]), and no carry from lower addition in the adding stage or from +1 at bottom portion to complete negation, so inverting is enough |
| 2 | Negative | 0, 1 | Invert D[n] where F'[n] = 0 | 1 | 0 | Negative difference (so negate by inverting D[n]), but +1 at bottom portion to complete negation causes carry to propagate to this portion - inverting where F'[n] = 0 gives same result |

TABLE 3-continued transformation of F'[n] for top portion of each data element
(for 16-bit data elements: portions 1, 3; for 32-bit data elements: portions 1, 2, 3)
$G_{k-1}$, $P_{k-1}$ refer to the group generate and group propagate values calculated
for portion k − 1 to the right of the portion k for which the $inv_k$ and $high_k$ signals are
being calculated (e.g. when calculating the signals for portion 3, $G_2$ and $P_2$ are used)

| element | $G_{k-1}, P_{k-1}$ | Action | $inv_k$ | $high_k$ | Why? |
|---|---|---|---|---|---|
| 3 Negative | 1, 0 | Invert D[n] where F'[n] = 0 | 1 | 0 | Negative difference (so negate by inverting D[n]), but there is a carry in from lower addition in the adding stage - inverting where F'[n] = 0 gives same result |
| 4 Negative | 1, 1 | Invert D[n] | 0 | 1 | Negative difference (so negate by inverting D[n]), but there is a carry in from lower addition in the adding stage, and also +1 at bottom portion to complete negation causes carry to propagate to this portion - inverting D[n] gives same result |
| 5 Positive | 0, — | Do not invert D[n] | 1 | 1 | Positive difference, so no negation, and no carry in from lower adder |
| 6 Positive | 1, — | Invert D[n] where F'[n] = 1 | 0 | 0 | Positive difference, so no negation, but there is a carry in from lower addition in the adding stage - inverting where F'[n] = 1 gives same result as "+1". |

TABLE 4 transformation of F'[n] for bottom portion of each data element
(for 8-bit data elements: portions 0, 1, 2, 3; for 16-bit data elements: portions 0, 2;
for 32-bit data elements: portion 0)
$G_{k-1}$, $P_{k-1}$ refer to the group generate and group propagate values calculated for portion
k − 1 to the right of the portion k for which the $inv_k$ and $high_k$ signals are being calculated.

| element | $G_{k-1}, P_{k-1}$ | Action | $inv_k$ | $high_k$ | Why? |
|---|---|---|---|---|---|
| 1 Negative | —, — | Invert D[n] where F'[n] = 0 | 1 | 0 | Negative so invert and +1, inverting where F'[n] = 0 gives same result |
| 2 Positive | —, — | Do not invert D[n] | 1 | 1 | Positive so don't need to negate |

Note that there are four possible manipulations of the flag bits—leaving the flag bits F'[n] unchanged (row 6 of Table 3), inverting the flag bits (rows 2 and 3 of Table 3 and row 1 of Table 4), forcing all the flag bits high (rows 1 and 4 of Table 3), and forcing all the flag bits low (row 5 of Table 3 and row 2 of Table 4). These can all be implemented using an OR gate 46-i and an XOR gate 48-i using the $inv_i$ and $high_i$ signals set as indicated in Tables 3 and 4 above.

Hence, the control signals generated by the control circuitry 40 enable the inverting stage 34 to invert the appropriate bits to generate the correct values of the absolute difference values V[i] for each 8-bit portion. This is demonstrated using a series of examples provided in the Appendix below. In this way, the result of each inverting unit 36-i has the same value as a corresponding 8-bit portion of an absolute difference value V would have if it was calculated with additions over the data element size and with negation being performed by inverting all the bits and adding one. However, by instead using a controlled selection of inversions of individual bits of each difference value D[i] based on an adjusted flag value F"[i], the absolute difference calculation operation can be performed more quickly.

The further adding stage 50 includes further adding units 52-i which each add an 8-bit portion of the absolute difference value V[i] to a corresponding 8-bit portion of the third operand R[i] to generate the corresponding portion of the result value R'[i]. The carry input value $ca_i$ for further adding units 52-1 to 52-3 is generated by AND gates 54-1, 54-2, 54-3 which AND the carry output value $co_i$ of further adding units 52-0 to 52-2 with a selection signal $sel_1$ to $sel_3$ respectively. The selection signals $sel_i$ are generated as shown in Table 5 below, so that effectively the carries will be propagated between further adding units 52-i operating on different portions of the same data element, but will be blocked from propagating between further adding units 52-i operating on different data elements:

TABLE 5

| size | $sel_3$ | $sel_2$ | $sel_1$ |
|---|---|---|---|
| 8-bit | 0 | 0 | 0 |
| 16-bit | 1 | 0 | 1 |
| 32-bit | 1 | 1 | 1 |

Figure 6:
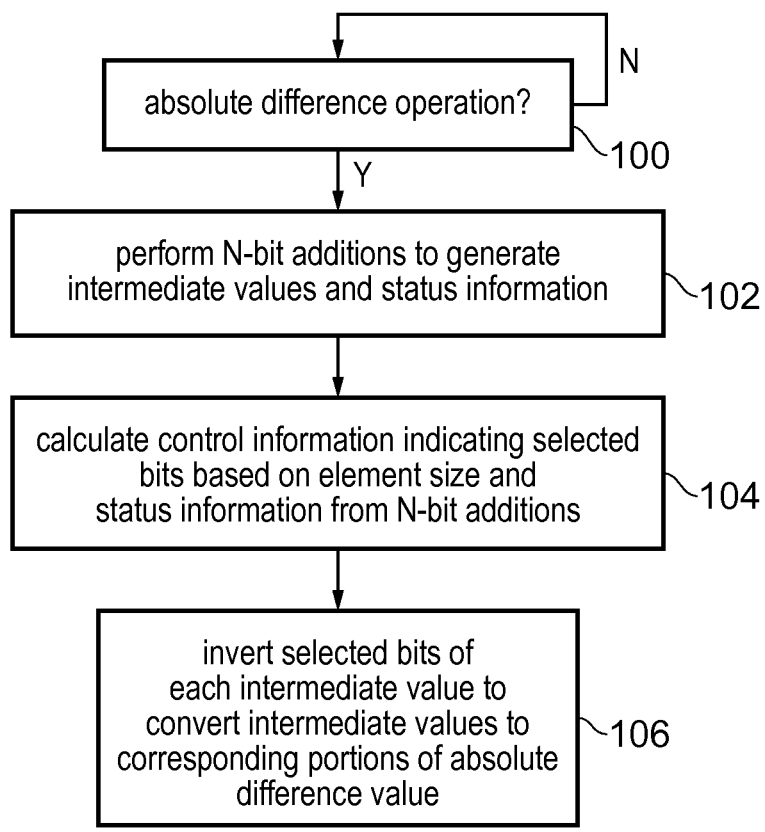
FIG. 6 illustrates a method of performing an absolute difference operation.

FIG. 6 illustrates a method of performing an absolute difference calculation. At step 100 it is determined whether or not the current operation to be processed is an absolute difference operation (including an absolute difference with accumulate operation). If not then some other processing is carried out. If so, then at step 102 the adding stage 32 performs a number of N-bit additions for respective N-bit portions of the operands A and B, to generate a number of N-bit intermediate values D[i]. The adding stage 32 also generates status information (e.g. the carry generate and propagate bits discussed above) for each N-bit addition. At step 104 the control circuitry 40 generates control information (e.g. the adjusted flag value F"[i]) based on the current data element size and the status information from the adding stage, to indicate the selected bits of each intermediate value to be inverted. As mentioned above, there may be several intermediate stages to generating this control information, such as generating the group propagate and group generate information P, G, generating the control signals $inv_i$, $high_i$ based on the group propagate/generate information, and then generating the adjusted flag value F'''[i]. At step 106, each inverting unit 36-$i$ of the inverting stage 34 inverts the selected bits of the corresponding intermediate value D[i] as indicated by the control information, to convert the intermediate value into the corresponding portion V[i] of the absolute difference value. Optionally, there may then be a further addition of the absolute difference value V and the third operand R if the current operation is an absolute difference with accumulate operation.

Some worked examples of absolute difference calculations are provided in the appendix below, showing that this technique achieves the correct processing results. In the appendix, 8-b, 16-b, 32-b are short hand for 8-bits, 16-bits and 32-bits respectively.

APPENDIX

Configurable wordlength absolute difference calculations using 8-b adders and flag bits. Concept of flag bits (applied to vectors of 4 8-b elements):

| A [31:0] | 11010100 | 01010100 | 01111010 | 11010100 |
|---|---|---|---|---|
| B [31:0] | 01111011 | 10101011 | 01100101 | 01100011 |
| F [31:0] | 00001111 | 11111111 | 00011111 | 00000111 |

F[n]=1 means invert sum[n+1] in order to increment the whole sum

F[n] is set high if all (A,B) pairs from bit n down are different i.e. F[n]=F[n−1]&(A[n]⊕B[n])

Example of F[n] usage for 8-b additions:

Left shift F by one place, append '1', and XOR with A+B to get A+B+1

| A [31:0] | 11010100 | 01010100 | 01111010 | 11010100 |
|---|---|---|---|---|
| B [31:0] | 01111011 | 10101011 | 01100101 | 01100011 |
| A+B | 101001111 | 011111111 | 010011111 | 100110111 |
| F' [31:0] | 000011111 | 111111111 | 000111111 | 000001111 |
| A+B+1 8b | 101010000 | 100000000 | 010100000 | 100111000 |

To perform unsigned absolute difference calculations, calculate A−B (=A−~B+1); if the result is negative, indicated by carry-out=0, invert the bits and add 1; otherwise keep the original difference.

To support configurable wordlength absolute differences using the results from several 8-b adders operating in parallel, we combine 8-b generate and propagate bits from each 8-b adder to give "group" G and P bits covering whole element width, where $g_3$ is derived from bits [31:24], $g_2$ and $p_2$ from bits [23:16], $g_1$ and $p_1$ from bits [15:8], and $g_0$ and $p_0$ from bits [7:0]. The most significant G bits indicate whether each element is positive or negative, while the other G bits indicate if each 8-b result receives a carry-in; the group P bits indicate whether each 8-b result receives a carry-in if the original result was negative, requiring the secondary "invert & +1" operation.

8b Elements (8b Groups, No P Bits Needed)
 $G_3=g_3$; $G_2=g_2$; $G_1=g_1$; $G_0=g_0$ 16b Elements (16b Groups, $P_3$ and $P_1$ not Needed)
 $G_3=g_3|p_3\&g_2$;
 $G_2=g_2$; $P_2=p_2$;
 $G_1=g_1|p_1\&g_0$;
 $G_0=g_0$; $P_0=p_0$ 32b Elements (32b Groups, $P_3$ not Needed)
 $G_3=g_3|p_3\&g_2|p_3\&p_2\&g_1|p_3\&p_2\&p_1\&g_0$
 $G_2=g_2|p_2\&g_1|p_2\&p_1\&g_0$, $P_2=P_2\&p_1\&p_0$
 $G_1=g_1|p_1\&g_0$; $P_1=p_1\&p_0$
 $G_0=g_0$; $P_0=p_0$ Examples of absolute difference calculations with different size vector elements In the examples below, the values in round brackets (1) or (0) indicated next to each result of an 8-bit addition represent the carry generate bit $g_i$ generated for the corresponding 8-bit addition. The values in square brackets [1] or [0] indicated next to the flag value F' generated for each 8-bit addition represent the carry propagate bit $p_i$ generated for the corresponding 8-bit addition.

8b Elements

Each 8-b adder's g bit shows whether the 8-b difference is positive or negative: if g=1, the result is positive and the original difference is the result; otherwise invert the difference and add 1. Here, we invert the result bits corresponding to F'[n]=0 since we also have to invert all the result bits.

| A [31:0] | 11010100 | 01010100 | 01111010 | 11010100 |
|---|---|---|---|---|
| ~B [31:0] | 01111011 | 10101011 | 01100101 | 01100011 |
| c | 1 | 1 | 1 | 1 |
| A+~B+c | (1) 01010000 | (1) 00000000 | (0) 11100000 | (1) 00111000 |
| F' [31:0] | [0] 00011111 | [1] 11111111 | [0] 00111111 | [0] 00001111 |
| 8-b G | 1 | 1 | 0 | 1 |
| Action | nothing | nothing | inv & +1 | nothing |
|  | inv none | inv none | inv@F=0 | inv none |
| Result | 01010000 | 00000000 | 00100000 | 00111000 |

16b Elements

Here, pairs of 8-b adder g and p bits are combined to find whether each 16-b difference is positive or negative, as described above. The p bit is only set high if A=B, and corresponds to the most significant F bit in each 8-b adder. We also have to take account of the g bit from the lower 8-b adder of each pair having to be added to the upper 8-b result. This is again achieved using the F bits.

| A [31:0] | 11010100 | 01010100 | 01111010 | 11010100 |
|---|---|---|---|---|
| ~B [31:0] | 01111011 | 10101011 | 01100101 | 01100011 |
| c | 0 | 1 | 0 | 1 |
| A+~B+c | (1) 01001111 | (1) 00000000 | (0) 11011111 | (1) 00111000 |
| F' [31:0] | [0] 00011111 | [1] 11111111 | [0] 00111111 | [0] 00001111 |
| 16-b P | — | 1 | — | 0 |
| 16-b G | 1 | 1 | 0 | 1 |
| Action | do not invert upper 16-b | | invert lower16-b & add1 | |
|  | +G | nothing | +G, inv | inv & +1 |
|  | inv@F=1 | inv none | inv@F=0 | inv@F=0 |
| Result | 01010000 | 00000000 | 00011111 | 11001000 |

32b Elements

Here, all the 8-b adder g and p bits are combined to find whether the 32-b difference is positive or negative. We also have to take account of any g bit propagating from the lower 8-b adders having to be added to each 8-b result. This is again achieved using the F bits.

| A [31:0] | 11010100 | 01010100 | 01111010 | 11010100 |
|---|---|---|---|---|
| ~B [31:0] | 01111011 | 10101011 | 01100101 | 01100011 |
| c | 0 | 0 | 0 | 1 |
| A+~B+c | (1) 01001111 | (0) 11111111 | (0) 11011111 | (1) 00111000 |
| F' [31:0] | [0] 00011111 | [1] 11111111 | [0] 00111111 | [0] 00001111 |
| 32-b P | — | 0 | 0 | 0 |
| 32-b G | 1 | 0 | 0 | 1 |
| Action | do not invert all 32-b | | | |
|  | nothing | nothing | +G | nothing |
|  | inv none | inv none | inv@F=1 | inv none |
| Result | 01001111 | 11111111 | 11100000 | 00111000 |

Here are the same examples repeated but with A and B swapped—results are the same although the 8-b differences are negated relative to the first examples (the F' bits are same).

| A [31:0] | 10000100 | 01010100 | 10011010 | 10011100 |
|---|---|---|---|---|
| B [31:0] | 11010100 | 01010100 | 01111010 | 11010100 |

8b Elements

| A [31:0] | 10000100 | 01010100 | 10011010 | 10011100 |
|---|---|---|---|---|
| ~B [31:0] | 00101011 | 10101011 | 10000101 | 00101011 |
| c | 1 | 1 | 1 | 1 |
| A+~B+c | (0) 10110000 | (1) 00000000 | (1) 00100000 | (0) 11001000 |
| F' [31:0] | [0] 00011111 | [1] 11111111 | [0] 00111111 | [0] 00001111 |
| 8-b G | 0 | 1 | 1 | 0 |
| Action | inv & +1 inv@F=0 | nothing inv none | nothing inv none | inv & +1 inv@F=0 |
| Result | 01010000 | 00000000 | 00100000 | 00111000 |

16b Elements

There is a complication in this example: adding 1 in the lower adder to complete the "invert & +1" of all 16 bits of the initial result can cause a second carry into the upper 8-b initial result, indicated here by +P. This is detected by the P bit being high in the lower 8-b adder when the combined G bit for the 16-b result is 0. These two +1's cancel out; leaving simply "invert all the bits" as an action. Here's a proof of why the two +1's cancel out:
~(N+1)+1=-(N+1-1)+1=-N+1=-(N-1)=~N

| A [31:0] | 10000100 | 01010100 | 10011010 | 10011100 |
|---|---|---|---|---|
| ~B [31:0] | 00101011 | 10101011 | 10000101 | 00101011 |
| c | 0 | 1 | 0 | 1 |
| A+~B+c | (0) 10101111 | (1) 00000000 | (1) 00011111 | (0) 11001000 |
| F' [31:0] | [0] 00011111 | [1] 11111111 | [0] 00111111 | [0] 00001111 |
| 16-b P | — | 1 | — | 0 |
| 16-b G | 0 | 1 | 1 | 0 |
| Action | invert upper 16-b & add 1 +G, inv, +P inv all | inv & +1 inv@F=0 | do not invert lower 16-b nothing inv none | nothing inv none |
| Result | 01010000 | 00000000 | 00011111 | 11001000 |

32b Elements

| A [31:0] | 10000100 | 01010100 | 10011010 | 10011100 |
|---|---|---|---|---|
| ~B [31:0] | 00101011 | 10101011 | 10000101 | 00101011 |
| c | 0 | 0 | 0 | 1 |
| A+~B+c | (0) 10101111 | (0) 11111111 | (1) 00011111 | (0) 11001000 |
| F' [31:0] | [0] 00011111 | [1] 11111111 | [0] 00111111 | [0] 00001111 |
| 32-b P | — | 0 | 0 | 0 |
| 32-b G | 0 | 1 | 1 | 0 |
| Action | invert all 32-b & add 1 +G, inv inv@F=0 | +G, inv inv@F=0 | invert inv all | inv & +1 inv@F=0 |
| Result | 01001111 | 11111111 | 11100000 | 00111000 |

"Extreme" 32-b Examples:
Top 8-b adder has A−B=1; other 8-b adders have A=B

| A [31:0] | 11010010 | 01010100 | 10011010 | 10011100 |
|---|---|---|---|---|
| B [31:0] | 11010001 | 01010100 | 10011010 | 10011100 |
| R [31:0] 32b | 00000001 | 00000000 | 00000000 | 00000000 |
| A [31:0] | 11010010 | 01010100 | 10011010 | 10011100 |
| ~B [31:0] | 00101110 | 10101011 | 01100101 | 01100011 |
| c | 0 | 0 | 0 | 1 |
| A+~B+c | (1) 00000000 | (0) 11111111 | (0) 11111111 | (0) 11111111 |
| F' [31:0] | [0] 00000001 | [1] 11111111 | [1] 11111111 | [1] 11111111 |
| 32-b P | — | 1 | 1 | 1 |
| 32-b G | 1 | 1 | 1 | 1 |
| Action | Do not invert all 32-b +G inv@F=1 | +G inv@F=1 | +G inv@F=1 | nothing inv none |
| Result | 00000001 | 00000000 | 00000000 | 00000000 |

Top and bottom 8-b adders have A−B=1; other 8-b adders have A=B. Result is one less than previous

| A [31:0] | 11010010 | 01010100 | 10011010 | 10011100 |
|---|---|---|---|---|
| B [31:0] | 11010001 | 01010100 | 10011010 | 10011101 |
| R [31:0] 32b | 00000000 | 11111111 | 11111111 | 11111111 |
| A [31:0] | 11010010 | 01010100 | 10011010 | 10011100 |
| ~B [31:0] | 00101110 | 10101011 | 01100101 | 01100010 |
| c | 0 | 0 | 0 | 1 |
| A+~B+c | (1) 00000000 | (0) 11111111 | (0) 11111111 | (0) 11111111 |
| F' [31:0] | [0] 00000001 | [1] 11111111 | [1] 11111111 | [0] 00000001 |
| 32-b P | — | 0 | 0 | 0 |
| 32-b G | 1 | 0 | 0 | 0 |
| Action | Do not invert all 32-b nothing inv none | nothing inv none | nothing inv none | nothing inv none |
| Result | 00000000 | 11111111 | 11111111 | 11111111 |

Bottom 8-b adder has A−B=1; other 8-b adders have A=B.

| A [31:0] | 11010100 | 01010100 | 10011010 | 10011101 |
|---|---|---|---|---|
| B [31:0] | 11010100 | 01010100 | 10011010 | 10011100 |
| R [31:0] 32b | 00000000 | 00000000 | 00000000 | 00000001 |
| A [31:0] | 11010100 | 01010100 | 10011010 | 10011101 |
| ~B [31:0] | 00101011 | 10101011 | 01100101 | 01100011 |
| c | 0 | 0 | 0 | 1 |
| A+~B+c | (0) 11111111 | (0) 11111111 | (0) 11111111 | (1) 00000001 |
| F' [31:0] | [1] 11111111 | [1] 11111111 | [1] 11111111 | [0] 00000001 |
| 32-b P | — | 0 | 0 | 0 |
| 32-b G | 1 | 1 | 1 | 1 |
| Action | Do not invert all 32-b +G inv@F=1 | +G inv@F=1 | +G inv@F=1 | nothing inv none |
| Result | 00000000 | 00000000 | 00000000 | 00000001 |

Extreme 32-b examples, repeat with A and B swapped—results must be the same (F' bits same as well)
Top 8-b adder has A−B=−1; other 8-b adders have A=B. There is the complication as earlier in this example: adding 1 in the lowest adder to complete the "invert & +1" of all 32 bits of the initial result causes a second carry into the upper 8-b initial results, indicated here by +P. This is detected by the combined P bit being high in the lower 8-b adder when the combined G bit for the 32-b result is 0.

| A [31:0] | 11010001 | 01010100 | 10011010 | 10011100 |
|---|---|---|---|---|
| B [31:0] | 11010010 | 01010100 | 10011010 | 10011100 |
| R [31:0] 32b | 00000001 | 00000000 | 00000000 | 00000000 |
| A [31:0] | 11010001 | 01010100 | 10011010 | 10011100 |
| ~B [31:0] | 00101101 | 10101011 | 01100101 | 01100011 |
| c | 0 | 0 | 0 | 1 |
| A+~B+c | (0) 11111110 | (0) 11111111 | (0) 11111111 | (1) 00000000 |
| F' [31:0] | [0] 00000001 | [1] 11111111 | [1] 11111111 | [1] 11111111 |
| 32-b P | — | 1 | 1 | 1 |
| 32-b G | 0 | 1 | 1 | 1 |
| Action | Invert all 32-b & +1 +G, inv, +P inv all | +G, inv, +P inv all | +G, inv, +P inv all | inv & +1 inv@F=0 |
| Result | 00000001 | 00000000 | 00000000 | 00000000 |

Top and bottom 8-b adders have A−B=−1; other 8-b adders have A=B. Result is one less than previous

| A [31:0] | 11010001 | 01010100 | 10011010 | 10011101 |
| B [31:0] | 11010010 | 01010100 | 10011010 | 10011100 |
| R [31:0]32b | 00000000 | 11111111 | 11111111 | 11111111 |
| A [31:0] | 11010001 | 01010100 | 10011010 | 10011101 |
| ~B [31:0] | 00101101 | 10101011 | 01100101 | 01100011 |
| c | 0 | 0 | 0 | 1 |
| A+~B+c | (0) 11111110 | (0) 11111111 | (0) 11111111 | (1) 00000001 |
| F' [31:0] | [0] 00000001 | [1] 11111111 | [1] 11111111 | [0] 00000001 |
| 32-b P | — | 0 | 0 | 0 |
| 32-b G | 0 | 1 | 1 | 1 |
| Action | Invert all 32-b & +1 | | | |
| | +G, inv | +G, inv | +G, inv | inv & +1 |
| | inv@F=0 | inv@F=0 | inv@F=0 | inv@F=0 |
| Result | 00000000 | 11111111 | 11111111 | 11111111 |

Bottom 8-b adder has A−B=−1; other 8-b adders have A=B.

| A [31:0] | 11010100 | 01010100 | 10011010 | 10011100 |
| B [31:0] | 11010100 | 01010100 | 10011010 | 10011101 |
| R [31:0] 32b | 00000000 | 00000000 | 00000000 | 00000001 |
| A [31:0] | 11010100 | 01010100 | 10011010 | 10011100 |
| ~B [31:0] | 00101011 | 10101011 | 01100101 | 01100010 |
| c | 0 | 0 | 0 | 1 |
| A+~B+c | (0) 11111111 | (0) 11111111 | (0) 11111111 | (0) 11111111 |
| F' [31:0] | [1] 11111111 | [1] 11111111 | [1] 11111111 | [0] 00000001 |
| 32-b P | — | 0 | 0 | 0 |
| 32-b G | 0 | 0 | 0 | 0 |
| Action | Invert all 32-b & +1 | | | |
| | invert | invert | invert | inv & +1 |
| | inv all | inv all | inv all | inv@F=0 |
| Result | 00000000 | 00000000 | 00000000 | 00000001 |

In summary, the bits of each 8-bit result are conditionally inverted depending on the values of the G and P bits and the sign of the initial difference as follows:

| element | $G_{k-1}$, $P_{k-1}$ | "Top" adders | "Bottom" adder |
|---|---|---|---|
| −ve | 0, 0 | Invert D[n] | Invert D[n] where F'[n] = 0 |
| −ve | 0, 1 | Invert D[n] where F'[n] = 0 | |
| −ve | 1, 0 | Invert D[n] where F'[n] = 0 | |
| −ve | 1, 1 | Invert D[n] | |
| +ve | 0, — | Do not invert D[n] | Do not invert D[n] |
| +ve | 1, — | Invert D[n] where F'[n] = 1 | |

If the element size is 8-b, all the adders are "bottom" adders. Thus, we can use two control bits per 8-b adder: one that can force all the F bits high or leave them as they are, and a second that inverts all the (possibly forced-high) F bits, as shown in the diagram below.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the claims.

We claim:

1. An apparatus comprising:
    processing circuitry to perform an absolute difference operation to generate an absolute difference value in response to a first operand and a second operand, wherein the first operand, the second operand and the absolute difference value each comprise at least one data element having a current data element size selected from a plurality of data element sizes, and each data element of the absolute difference value represents an absolute difference between corresponding data elements of the first and second operands;
    the processing circuitry comprising:
    an adding stage to perform at least one addition using corresponding portions of the first operand and the second operand to generate at least one intermediate value, and to generate status information in dependence on said at least one addition, wherein each portion comprises a whole or part of a data element having said current data element size;
    an inverting stage to selectively invert selected bits of the at least one intermediate value to convert the at least one intermediate value into at least one corresponding portion of the absolute difference value; and
    control circuitry responsive to the current data element size and said status information to generate control information identifying said selected bits of the at least one intermediate value.

2. The apparatus according to claim 1, wherein the adding stage comprises a plurality of N-bit adding units each to perform an N-bit addition using corresponding N-bit portions of the first operand and the second operand to generate an N-bit intermediate value; and
    the inverting stage comprises a plurality of N-bit inverting units each to invert selected bits of the N-bit intermediate value generated by a corresponding adding unit to generate a corresponding N-bit portion of the absolute difference value.

3. The apparatus according to claim 2, wherein each adding unit is configured to add an N-bit portion of the first operand to an inverted value obtained by inverting a corresponding N-bit portion of the second operand.

4. The apparatus according to claim 3, wherein each adding unit is configured to add the N-bit portion of the first operand, the inverted value and a carry value selected based on the current data element size.

5. The apparatus according to claim 2, wherein when the current data element size M is greater than N bits:
    for each inverting unit, the control circuitry is configured to control the inverting unit to invert selected bits of the N-bit intermediate value to convert the N-bit intermediate value to an N-bit value which is equivalent to a corresponding N-bit portion of an M-bit value which would be obtained by performing an M-bit addition on corresponding M-bit data elements of the first and second operand values to generate a subtraction result and negating the subtraction result when the subtraction result is negative.

6. The apparatus according to claim 5, wherein the control circuitry is configured to select said selected bits in dependence on a determination of whether the M-bit addition on the corresponding M-bit data elements would cause a carry in to said corresponding N-bit portion.

7. The apparatus according to claim 5, wherein the control circuitry is configured to select said selected bits in dependence on a determination of whether said negating the subtraction result would cause a carry in to said corresponding N-bit portion.

8. The apparatus according to claim 2, wherein each adding unit is configured to output at least one status indication in dependence on the addition performed by that adding unit, and the control circuitry is to generate the control information in dependence on the current data element size and the at least one status indication of one or more of the adding units.

9. The apparatus according to claim 8, wherein the at least one status indication comprises at least one of:
  a carry generate value indicative of whether the addition performed by that adding unit generates a carry output; and
  a carry propagate value indicative of whether a carry in to the addition performed by that adding unit would trigger a carry output from the addition performed by that adding unit.

10. The apparatus according to claim 8, wherein the control circuitry is to determine, depending on the current data element size and said at least one status indication of said one or more of the adding units, at least one group status indication indicative of at least one property of a group of N-bit additions performed on respective portions of the first and second operands corresponding to the same data element, and to determine the control information identifying said selected bits based on said at least one group status indication.

11. The apparatus according to claim 10, wherein when the current data element size is M bits, the at least one group status indication comprises at least one of:
  a sign value indicative of whether, if the group of N-bit additions had been performed as an M-bit addition, the result of the M-bit addition would be positive or negative;
  at least one group generate value indicative of whether, if the group of N-bit additions had been performed as an M-bit addition, there would be a carry from a lower N bits to an upper N bits of the M-bit addition; and
  at least one group propagate value indicative of whether, if the group of N-bit additions had been performed as an M-bit addition, a carry in to the M-bit addition would cause a carry to propagate to one or more upper N-bit portions of the M-bit addition.

12. The apparatus according to claim 8, wherein the at least one status indication comprises a flag value indicative of which bits of the intermediate value generated in the addition performed by that adding unit would change state if 1 was added to the result of the addition.

13. The apparatus according to claim 12, wherein for each inverting unit, the control circuitry comprises flag value adjustment circuitry to selectively adjust the flag value generated by the corresponding adding unit in dependence on the current data element size and said at least one status indication generated by one or more of the adding units, to generate an adjusted flag value identifying which bits of the intermediate value are to be inverted by the inverting unit.

14. The apparatus according to claim 13, wherein the inverting unit is configured to XOR the intermediate value with the adjusted flag value.

15. The apparatus according to claim 13, wherein the flag value adjustment circuitry is configured to generate, as the adjusted flag value, one of:
  the flag value;
  an inverted version of the flag value;
  a value for which all bits are 1; and
  a value for which all bits are 0.

16. The apparatus according to claim 1, wherein the processing circuitry is configured to perform the absolute difference operation in response to an absolute difference instruction specifying the first operand and the second operand.

17. The apparatus according to claim 1, wherein the processing circuitry is configured to perform the absolute difference operation in response to an absolute-difference-accumulate instruction specifying the first operand, the second operand and a third operand comprising at least one data element; and
  wherein the processing circuitry comprises a further adding stage to add corresponding portions of the absolute difference value and the third operand to generate a result value comprising at least one data element, each data element of the result value representing the sum of a corresponding data element of the third operand and the absolute difference between the corresponding data elements of the first and second operands.

18. An apparatus comprising:
  processing means for performing an absolute difference operation to generate an absolute difference value in response to a first operand and a second operand, wherein the first operand, the second operand and the absolute difference value each comprise at least one data element having a current data element size selected from a plurality of data element sizes, and each data element of the absolute difference value represents an absolute difference between corresponding data elements of the first and second operands;
  the processing means comprising:
  adding means for performing at least one addition using corresponding portions of the first operand and the second operand to generate at least one intermediate value, and to generate status information in dependence on said at least one addition, wherein each portion comprises a whole or part of a data element having said current data element size;
  inverting means for selectively inverting selected bits of the at least one intermediate value to convert the at least one intermediate value into at least one corresponding portion of the absolute difference value; and
  control means for generating, in response to the current data element size and said status information control information identifying said selected bits of the at least one intermediate value.

19. A method of performing an absolute difference operation to generate an absolute difference value in response to a first operand and a second operand, wherein the first operand, the second operand and the absolute difference value each comprise at least one data element having a current data element size selected from a plurality of data element sizes, and each data element of the absolute difference value represents an absolute difference between corresponding data elements of the first and second operands;
  the method comprising:
  processing circuitry performing at least one addition using corresponding portions of the first operand and the second operand to generate at least one intermediate value, and generating status information in dependence on said at least one addition, wherein each portion comprises a whole or part of a data element having said current data element size;
  in response to the current data element size and said status information, control circuitry generating control information identifying selected bits of the at least one intermediate value; and an inverter stage inverting the selected bits of the at least one intermediate value indicated by the control information to convert the at least one intermediate value into at least one corresponding portion of the absolute difference value.

* * * * *